United States Patent
Nakata

(10) Patent No.: US 8,479,850 B2
(45) Date of Patent: Jul. 9, 2013

(54) BRAKE CONTROL DEVICE

(75) Inventor: Daisuke Nakata, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/394,228

(22) PCT Filed: Sep. 3, 2009

(86) PCT No.: PCT/JP2009/004365
§ 371 (c)(1),
(2), (4) Date: Mar. 5, 2012

(87) PCT Pub. No.: WO2011/027398
PCT Pub. Date: Mar. 10, 2011

(65) Prior Publication Data
US 2012/0160580 A1 Jun. 28, 2012

(51) Int. Cl.
*B60W 10/18* (2012.01)
*B60W 10/26* (2006.01)

(52) U.S. Cl.
USPC ............... 180/65.29; 903/947; 320/150

(58) Field of Classification Search
USPC ............... 180/65.265, 65.275, 65.285, 65.29, 180/65.31, 65.6; 903/903, 947; 320/150, 320/153
See application file for complete search history.

(56) References Cited

U.S. PATENT DOCUMENTS

| 6,163,135 | A | 12/2000 | Nakayama et al. |
| 6,501,250 | B2 * | 12/2002 | Bito et al. ................. 320/152 |
| 7,234,552 | B2 * | 6/2007 | Prema et al. ............ 180/65.29 |
| 7,923,950 | B2 * | 4/2011 | Takahashi .................. 318/376 |

FOREIGN PATENT DOCUMENTS

| JP | 2000 92614 | 3/2000 |
| JP | 2001 268715 | 9/2001 |
| JP | 2006 278045 | 10/2006 |
| JP | 2007 151216 | 6/2007 |

OTHER PUBLICATIONS

International Preliminary Report on Patentability issued Aug. 16, 2011, in PCT/JP2009/004365, filed Sep. 3, 2009 (with English-language translation).
International Search Report Issued Nov. 2, 2009 in PCT/JP09/04365 Filed Sep. 3, 2009.

* cited by examiner

*Primary Examiner* — John Walters
(74) *Attorney, Agent, or Firm* — Oblon, Spivak, McClelland, Maier & Neustadt, L.L.P.

(57) ABSTRACT

A fluid pressure brake unit generates a friction braking force by supplying an operating fluid to a wheel cylinder provided to each wheel of a vehicle so as to press a brake pad against the wheel. A regenerative brake unit generates a regenerative braking force by electric power regeneration to a motor that drives the wheel. A battery collects electric power from the motor. A low-temperature determination unit determines that the temperature of the battery is low when the temperature of the battery is below a predetermined temperature range. A battery temperature increasing unit generates, when the temperature of the battery is determined to be low, a braking force to the vehicle by at least either a fluid pressure brake unit or a regenerative brake unit during acceleration of the vehicle by the motor or the engine.

3 Claims, 7 Drawing Sheets

BRAKE CONTROL DEVICE

TECHNICAL FIELD

The present invention relates to a braking technology in a hybrid vehicle provided with both a fluid pressure brake unit and a regenerative brake unit.

BACKGROUND ART

Hybrid vehicles are known that run using engines and motors as power sources. In hybrid vehicles, a regenerative brake can be used that activates a motor as a generator during deceleration of the vehicles and collects generated electrical energy in a battery so as to use the electrical energy as a braking force. The battery has the property that the amount of input and output of the electrical energy drops dramatically when the temperature of the battery drops due to, e.g., a vehicle being left for a long time in winter time. As a result, until the temperature of the battery rises, there are less driving force assistance and amount of energy collection by the motor, lowering energy efficiency. Particularly, in the case of a lithium battery, the acceptable temperature range is extremely narrow compared to a nickel battery, etc. Therefore, it is necessary to promptly raise the battery temperature to the acceptable range in order for the improvement of energy efficiency.

Patent Document No. 1 discloses increasing the discharging current and charging current of a battery so as to raise the temperature of the battery when the temperature of the battery is low by repeating both control of increasing a motor driving force as much as a decrease in an engine driving force such that the battery discharges and control of decreasing the motor driving force as much as an increase in the engine driving force such that the battery charges.

Patent Documents

[Patent Document No. 1] Japanese Patent Application Publication No. 2001-268715
[Patent Document No. 2] Japanese Patent Application Publication No. 2006-278045
[Patent Document No. 3] Japanese Patent Application Publication No. 2007-151216

SUMMARY OF THE INVENTION

Problem to be Solved by the Invention

However, in the techniques described in Patent Document No. 1, there is a possibility that the temperature of a battery cannot be raised promptly if the driving force of a vehicle remains small.

In this background, a purpose of the present invention is to provide a technique for raising the temperature of a battery promptly to a proper temperature when the temperature of the battery is low in a hybrid vehicle.

Means to Solve the Problem

One aspect of the present invention relates to a brake control apparatus. The brake control apparatus comprises: an engine configured to drive a wheel; a friction braking unit configured to generate a friction braking force by supplying an operating fluid to a wheel cylinder provided to each wheel of a vehicle so as to press a friction member against the wheel; a regenerative braking unit configured to generate a regenerative braking force by electric power regeneration to a rotating electrical machine that drives the wheel; a regenerative-cooperative control unit configured to control a distribution ratio of a braking force generated by the friction braking unit and the regenerative braking unit in accordance with a braking request from a driver; a battery configured to collect electric power from the rotating electrical machine; a low-temperature determination unit configured to determine that the temperature of the battery is low when the temperature of the battery is below a predetermined temperature range; and a battery temperature increasing unit configured to generate, when the temperature of the battery is determined to be low by the low-temperature determination unit, a braking force to the vehicle by at least either the friction braking unit or the regenerative braking unit during acceleration of the vehicle by the rotating electrical machine or the engine so as to increase a load on the rotating electrical machine.

According to the aspect, when the temperature of the battery is low, at least either a friction braking force or a regenerative braking force is generated during the acceleration of the vehicle. When the friction braking force is generated, the load on the rotating electrical machine increases such that electrical energy, which is larger than that of when there is no friction braking force, is released from the battery to the rotating electrical machine. Thus, the temperature of the battery can be increased promptly. When the regenerative braking force is generated, electrical energy is collected in the battery from the rotating electrical machine. Thus, the temperature of the battery can be increased promptly. Therefore, the performance of the battery in energy collection can be recovered, and the fuel efficiency can be improved. Further, when the friction braking force is generated, the temperature of the friction member also increases. Thus, the brake feeling can be also improved.

The friction braking unit may include an accumulator for increasing the pressure of the operating fluid supplied to the wheel cylinder by pump drive and an accumulator pressure measurement unit for measuring the pressure of the accumulator. The low-temperature determination unit may determine that the temperature of the battery is low when time required for increasing the pressure of the accumulator to a predetermined pressure by the pump is longer than pressure rising time required when the temperature of the accumulator is in the predetermined temperature range. According to this, whether the temperature of the battery is low is determined using the accumulator pressure of the friction braking unit. Thus, it is not necessary to provide a sensor or the like for detecting the temperature of the battery.

The brake control apparatus may further comprise a low-temperature determination cancellation unit configured to cancel the determination that the temperature of the battery is low determined by low-temperature determination unit. The low-temperature determination unit may include: an acceleration and deceleration count unit configured to count the number of times the vehicle experiences acceleration and deceleration; and a count determination unit configured to cancel the determination that the temperature of the battery is low when the number of counts reaches a first threshold value during non-operation of the regenerative brake unit and to cancel the determination that the temperature of the battery is low when the number of counts reaches a second threshold value, which is smaller than the first threshold value, during operation of the regenerative brake unit. With this, when the temperature of the battery is determined to be low, the determination that the temperature is low can be canceled based on the number of acceleration and deceleration events of the vehicle. Also, in consideration that the battery will be charged and discharged more often when the regenerative braking unit is in operation, in other words, when the regenerative coordination is being performed, the determination that the temperature is low can be canceled with less number of acceleration and deceleration events compared to when the regenerative braking unit is not in operation.

The brake control apparatus may further comprise a low-temperature determination cancellation unit configured to cancel the determination that the temperature of the battery is low determined by low-temperature determination unit. The low-temperature determination unit may include: a temperature measurement unit configured to measure the temperature of the interior of the vehicle; and a room-temperature monitoring unit configured to cancel the determination that the temperature of the battery is low, when a condition where the temperature of the interior of the vehicle is a predetermined temperature or greater has persisted for at least a predetermined time period that is estimated for the temperature of the battery to rise to the predetermined temperature range. With this, the determination that the temperature of the battery is low can be canceled using the temperature of the interior of the vehicle.

Advantage of the Present Invention

According to the present invention, the amount of regenerative energy that is collected by a battery can be increased by raising the temperature of the battery promptly to a proper temperature when the temperature of the battery is low in a hybrid vehicle.

BEST MODE FOR CARRYING OUT THE INVENTION

An embodiment of the present invention relates to a brake control apparatus that is applied to a hybrid vehicle provided with: a fluid pressure brake unit that supplies an operating fluid from a fluid pressure generation source to a wheel cylinder provided to each wheel of the vehicle so as to apply a braking force to the wheel; and a regenerative brake unit that applies a driving force or a regenerative braking force to the wheel by a rotating electrical machine (hereinafter, simply referred to as a "motor").

In the following, a description is made first regarding the configuration of a hybrid vehicle according to the present embodiment and then regarding the configuration of a fluid pressure brake unit installed in the hybrid vehicle. A detailed explanation is then given of temperature raising control, according to the present embodiment, when the temperature of a battery is low.

Figure 1:
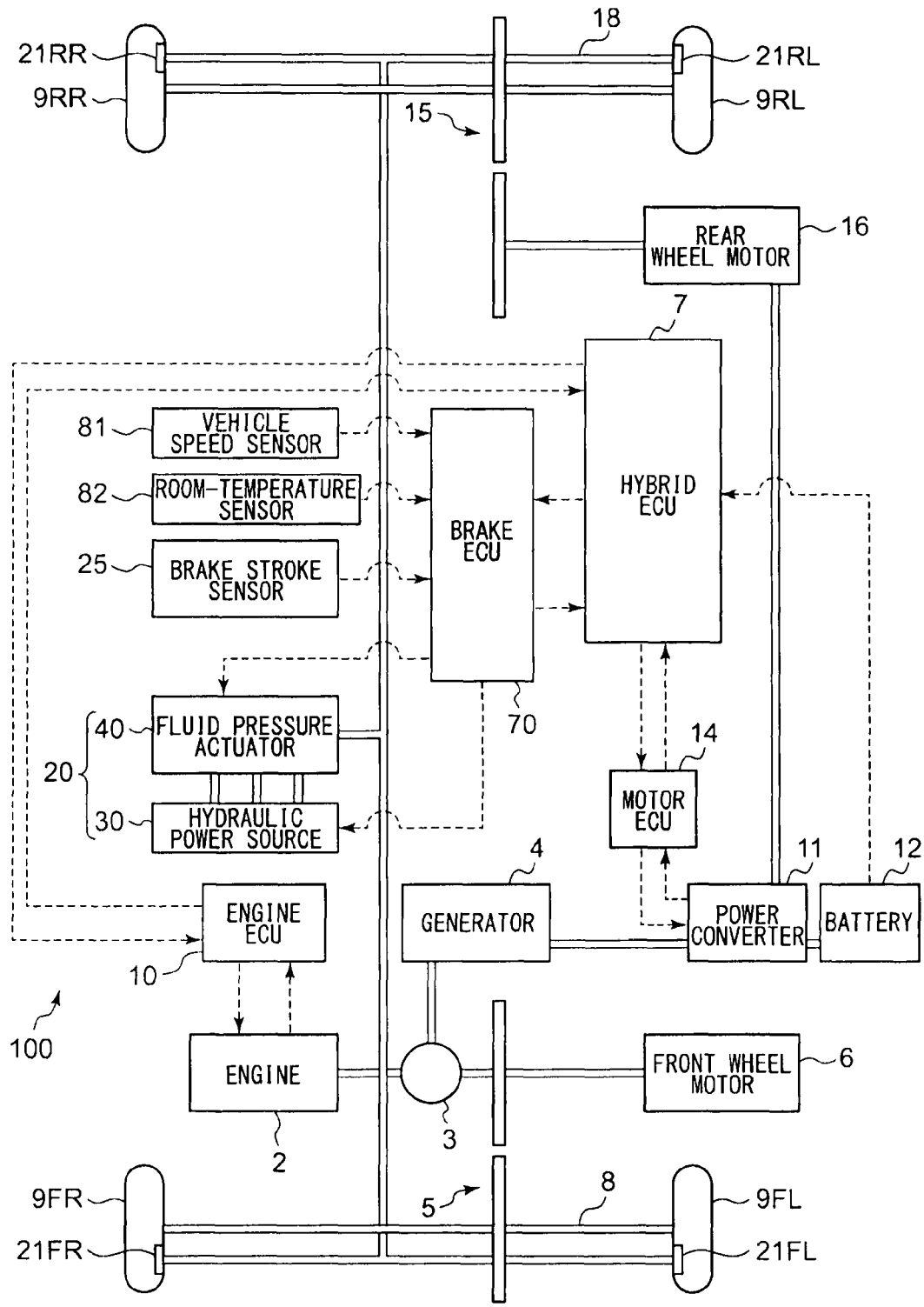
FIG. 1 is a schematic diagram illustrating the configuration of a hybrid vehicle to which a brake control apparatus according to an embodiment of the present invention is applied.

FIG. 1 is a schematic diagram illustrating the configuration of a vehicle 100 to which a brake control apparatus according to the present embodiment is applied. The vehicle 100 is formed as a so-called hybrid vehicle and comprises: an engine 2; a three-axis power split mechanism 3 that is connected to a crankshaft that serves as an output shaft of the engine 2; a generator 4 that is connected to the power split mechanism 3 and is capable of generating electric power; a front wheel motor 6 that is connected to the power split mechanism 3 via a transmission 5; and a hybrid electronic control unit (hereinafter, referred to as a "hybrid ECU," and electronic control units are all referred to as "ECU") 7 that controls the entire drive system of the vehicle 100. A right front wheel 9FR and a left front wheel 9FL of the vehicle 100 are connected to the transmission 5 via a drive shaft 8.

The engine 2 is an internal combustion engine that is driven using hydrocarbon fuel, for example, gasoline, light oil, etc., and is controlled by an engine ECU 10. The engine ECU 10 is capable of communicating with the hybrid ECU 7 and performs fuel injection control, ignition control, air intake control, etc., of the engine 2 based on a control signal from the hybrid ECU 7 and signals from various sensors that detect the operating state of the engine 2. The engine ECU 10 provides information regarding the operating state of the engine 2 to the hybrid ECU 7 when needed.

The vehicle 100 also comprises a rear wheel motor 16. A right rear wheel 9RR and a left rear wheel 9RL of the vehicle 100 are connected to a transmission 15 via a drive shaft 18. An output from the rear wheel motor 16 is transmitted to the right and left rear wheels 9RR and 9RL via the transmission 15.

The power split mechanism 3 plays a role of transmitting an output from the front wheel motor 6 to the right and left front wheels 9FR and 9FL via the transmission 5, a role of allocating an output from the engine 2 to the generator 4 and the transmission 5, and a role of decreasing or increasing a rotational speed of the front wheel motor 6 and the engine 2. The generator 4, the front wheel motor 6, and the rear wheel motor 16 are all connected to a battery 12 via a power converter 11 that includes an inverter, and a motor ECU 14 is connected to the power converter 11. The motor ECU 14 is also capable of communicating with the hybrid ECU 7 and controls the generator 4, the front wheel motor 6, and the rear wheel motor 16 via the power converter 11 based on a control signal, etc., from the hybrid ECU 7. The hybrid ECU 7, the engine ECU 10, and the motor ECU 14 that are stated above are each formed as a microprocessor including a CPU and is provided with, in addition to the CPU, a ROM for storing various programs, a RAM for temporarily storing data, input/output ports, communication ports, and so forth.

By providing electric power from the battery 12 to the front wheel motor 6 and the rear wheel motor 16 via the power converter 11 under control of the hybrid ECU 7 and the motor ECU 14, the right and left front wheels 9FR and 9FL can be driven by an output from the front wheel motor 6, and the right and left rear wheels 9RR and 9RL can be driven by an output from the rear wheel motor 16. The vehicle 100 is driven by the engine 2 in an operation area with good engine efficiency. In this case, by transmitting a part of the output from the engine 2 to the generator 4 via the power split mechanism 3, the front wheel motor 6 can be driven, and the battery 12 can be charged via the power converter 11, using electric power produced by the generator 4.

When putting a brake on the vehicle 100, the front wheel motor 6 is rotated by power transmitted from the front wheels 9FR and 9FL under control of the hybrid ECU 7 and the motor ECU 14 such that the front wheel motor 6 is activated as a generator. The rear wheel motor 16 is rotated by power transmitted from the rear wheels 9RR and 9RL such that the rear wheel motor 16 is activated as a generator. In other words, the front wheel motor 6, the rear wheel motor 16, the power converter 11, the hybrid ECU 7, the motor ECU 14, and the like function as a regenerative brake unit that puts a brake on the vehicle 100 by regenerating kinetic energy of the vehicle 100 into electrical energy.

In addition to such a regenerative brake unit, a brake control apparatus according to the present embodiment is also provided with a fluid pressure brake unit and puts a brake on the vehicle 100 by performing regenerative-cooperative braking control for allowing the both units to cooperate with each other. A cooperative control unit included in the hybrid ECU 7 normally determines a distribution ratio of a fluid pressure braking force and a regenerative braking force in accordance with a braking request from a driver and requests a braking force from the fluid pressure brake unit 20 and the regenerative brake unit.

Figure 2:
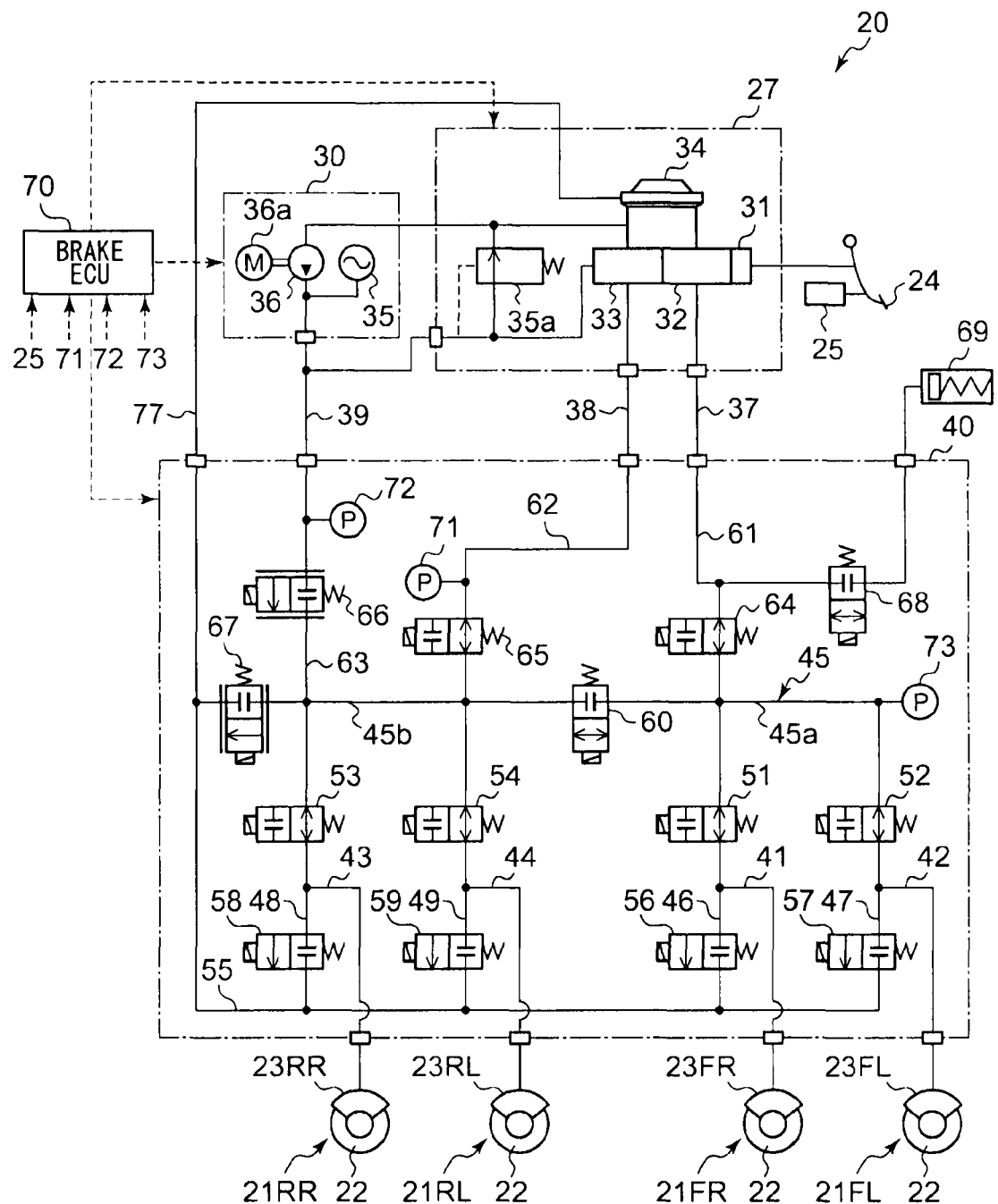
FIG. 2 is a diagram illustrating the configuration of a fluid pressure brake unit.

FIG. 2 illustrates the configuration of the fluid pressure brake unit 20. The fluid pressure brake unit 20 includes disc brake units 21FR, 21FL, 21RR, and 21RL provided at the right and left front wheels 9FR and 9FL and the right and left rear wheels 9RR and 9RL, respectively, a hydraulic power source 30 that serves as a supply source of a brake oil serving as an operating fluid for each of the disc brake units 21FR through 21RL, and a fluid pressure actuator 40 capable of setting a braking force for each wheel of the vehicle 100 by appropriately adjusting the fluid pressure of the brake oil from the hydraulic power source 30 and then by supplying the brake oil to each of the disc brake units 21FR through 21RL.

Each of the disc brake units 21FR through 21RL includes a brake disc 22 and a brake caliper 23, and a wheel cylinder (not shown) is built in each brake caliper 23. The wheel cylinders of respective brake calipers 23 are connected to the fluid pressure actuator 40 each via an independent fluid channel. As a brake oil is supplied to a wheel cylinder of a brake caliper 23 from the fluid pressure actuator 40, a brake pad serving as a friction member is pressed against the brake disc 22 rotating together with the wheel, and a fluid pressure brake torque is applied to each wheel.

A master cylinder unit 27 is a master cylinder with a hydraulic pressure booster in the present embodiment and includes a hydraulic pressure booster 31, a master cylinder 32, a regulator 33, and a reservoir 34. The hydraulic pressure booster 31 connected to the brake pedal 24 can amplify a pedal depressing force exerted on the brake pedal 24 and then transmit the amplified pedal depressing force to the master cylinder 32. The pedal depressing force is amplified as the brake fluid is fed from the hydraulic power source 30 to the hydraulic pressure booster 31 via the regulator 33. The master cylinder 32 generates a master cylinder pressure having a predetermined booster ratio with respect to the pedal depressing force.

The reservoir 34 for storing the brake fluid is arranged above the master cylinder 32 and the regulator 33. When the brake pedal 24 is released, the master cylinder 32 communicates with the reservoir 34. On the other hand, the regulator 33 communicates with both the reservoir 34 and an accumulator 35 of the hydraulic power source 30. Using the reservoir 34 as a low pressure source and the accumulator 35 as a high pressure source, the regulator 33 generates a fluid pressure, which is substantially the same as the master cylinder pressure. The fluid pressure generated by the regulator 33 is hereinafter referred to as a "regulator pressure." The master cylinder pressure and the regulator pressure need not to be exactly equal to each other. For example, it is also possible to design the master cylinder unit 27 such that the regulator pressure is slightly higher than the master cylinder pressure.

The hydraulic power source 30 includes the accumulator 35 and a pump 36. The accumulator 35 converts the pressure energy of the brake fluid pressurized by the pump 36 to the pressure energy of a filler gas such as a nitrogen gas or the like, e.g., to a pressure of about 14 to 22 MPa, and then stores the converted pressure energy. The pump 36 has a motor 36a as a driving power source. An inlet port thereof is connected to the reservoir 34, and an outlet port thereof is connected to the accumulator 35. The accumulator 35 is also connected to a relief valve 35a provided in the master cylinder unit 27. If the pressure of the brake fluid in the accumulator 35 grows abnormally high and reaches, e.g., about 25 MPa, the relief valve 35a is opened to return the high pressure brake fluid to the reservoir 34.

As described above, the fluid pressure brake unit 20 has the master cylinder 32, the regulator 33, and the accumulator 35, which serve as brake fluid sources for the disc brake units 21. A master pipeline 37, a regulator pipeline 38, and an accumulator pipeline 39 are connected to the master cylinder 32, the regulator 33, and the accumulator 35, respectively. The master pipeline 37, the regulator pipeline 38, and the accumulator pipeline 39 are each connected to the fluid pressure actuator 40.

The fluid pressure actuator 40 includes an actuator block having a plurality of fluid channels formed therein and a plurality of electromagnetic control valves. The fluid channels formed in the actuator block includes individual channels 41, 42, 43, and 44 and a main channel 45. The individual channels 41 through 44 diverge from the main channel 45 and connected to the corresponding disc brake units 21FR, 21FL, 21RR and 21RL, respectively. This allows the respective disc brake units 21FR through 21RL to communicate with the main channel 45. In the middle of the individual channels 41, 42, 43, and 44, increased pressure holding valves 51, 52, 53, and 54 are provided. The increased pressure holding valves 51 through 54 each have an ON/OFF controlled solenoid and a spring and are normally-opened type electromagnetic control valves that are opened when the solenoid is in a de-energized state.

Further, the disc brake units 21FR through 21RL are connected to a pressure-reducing channel 55 via pressure-reducing channels 46, 47, 48, and 49 that are connected to the individual channels 41 through 44, respectively. In the middle of the pressure-reducing channels 46, 47, 48, and 49, pressure-reducing control valves 56, 57, 58, and 59 are provided. The pressure-reducing control valves 56 through 59 each have an ON/OFF controlled solenoid and a spring and are normally-closed type electromagnetic control valves that are closed when the solenoid is in a de-energized state.

The main channel 45 has a communication valve 60 in the middle thereof and is divided by the communication valve 60 into a first channel 45a connected to the individual channels 43 and 44 and a second channel 45b connected to the individual channels 41 and 42. The first channel 45a is connected to the disc brake units 21RR and 21RL of the rear wheels via the individual channels 43 and 44, and the second channel 45b is connected to the disc brake units 21FR and 21FL of the front wheels via the individual channels 41 and 42. The communication valve 60 has an ON-OFF controlled solenoid and a spring. The communication valve 60 is a normally-closed type electromagnetic control valve that is closed when the solenoid is in a de-energized state.

The main channel 45 is connected to a master channel 61 connected to a master pipeline 37 that communicates with the master cylinder 32, a regulator channel 62 connected to the regulator pipeline 38 that communicates with the regulator 33, and an accumulator channel 63 connected to the accumulator pipeline 39 that communicates with the accumulator 35. More specifically, the master channel 61 is connected to the second channel 45b of the main channel 45, and the regulator channel 62 and the accumulator channel 63 are connected to the first channel 45a of the main channel 45. Further, the pressure-reducing channel 55 is connected to the reservoir 34 of the hydraulic power source 30.

The master channel 61 has a master pressure cut valve 64 in the middle thereof. The master pressure cut valve 64 has an ON/OFF controlled solenoid and a spring and is a normally-opened type electromagnetic control valve that is opened when the solenoid is in a de-energized state. The regulator channel 62 has a regulator pressure cut valve 65 in the middle thereof. The regulator pressure cut valve 65 has an ON/OFF controlled solenoid and a spring and is a normally-opened type electromagnetic control valve that is opened when the solenoid is in a de-energized state. The accumulator channel 63 has a pressure-increasing linear control valve 66 in the middle thereof, and the accumulator channel 63 and the first channel 45a of the main channel 45 are connected to the pressure-reducing channel 55 via the pressure-reducing linear control valve 67.

The pressure-increasing linear control valve 66 and the pressure-reducing linear control valve 67 each have a linear solenoid and a spring and are both normally-closed type electromagnetic control valves that are closed when the solenoid is in a de-energized state. The differential pressure between inlet and outlet ports of the pressure-increasing linear control valve 66 corresponds to the difference between the pressure of the brake oil in the accumulator 35 and the pressure of the brake oil in the main channel 45. The differential pressure between inlet and outlet ports of the pressure-reducing linear control valve 67 corresponds to the difference between the pressure of the brake oil in the main channel 45 and the pressure of the brake oil in the pressure-reducing channel 55. Given that an electromagnetic driving force according to the electric power supplied to the linear solenoids of the pressure-increasing linear control valve 66 and the pressure-reducing linear control valve 67 is expressed as F1, that a biasing force of the springs is expressed as F2, and that a differential pressure acting force according to the differential pressure between the inlet and outlet ports of the pressure-increasing linear control valve 66 and the pressure-reducing linear control valve 67 is expressed as F3, the following relationship holds: F1+F3=F2. Therefore, it is possible to control the differential pressure between the inlet and outlet ports of the pressure-increasing linear control valve 66 and the pressure-reducing linear control valve 67 by continuously controlling the electric power supply to the linear solenoids of the linear control valves 66 and 67.

Since the pressure-increasing linear control valve 66 is a normally-closed type electromagnetic control valve as described above, the main channel 45 will be cut off from the accumulator 35, which serves as a high-pressure hydraulic source, when the pressure-increasing linear control valve 66 is in a de-energized state. Since the pressure-reducing linear control valve 67 is a normally-closed type electromagnetic control valve as described above, the main channel 45 will be cut off from the reservoir 34 when the pressure-reducing linear control valve 67 is in a de-energized state. In this respect, it can be said that the main channel 45 is also connected to the reservoir 34, which serves as a low-pressure hydraulic source.

Meanwhile, a stroke simulator 69 is connected to the master channel 61 via a simulator cut valve 68 on an upstream side of the master pressure cut valve 64. The simulator cut valve 68 has an ON/OFF controlled solenoid and a spring and is a normally-closed type electromagnetic control valve that is closed when the solenoid is in a de-energized state. The stroke simulator 69 includes a plurality of pistons and springs. When the simulator cut valve 68 is opened, the stroke simulator 69 generates a reaction force in proportion to the depressing force of the brake pedal 24 applied by a driver. A stroke simulator having multi-stage spring characteristics is preferably employed as the stroke simulator 69 in order for the driver to have an improved brake operation feeling. The stroke simulator 69 according to the present embodiment has four-stage spring characteristics.

The hydraulic power source 30 and the fluid pressure actuator 40, which are formed as described above, are controlled by a brake ECU 70 that serves as a control means. The brake ECU 70 is formed as a microprocessor including a CPU and is provided with a ROM for storing various programs, a RAM for temporarily storing data, input/output ports, communication ports, etc., in addition to the CPU. The brake ECU 70 is capable of making communication with a hybrid ECU 7. The brake ECU 70 controls the pump 36 of the hydraulic power source 30 and the electromagnetic control valves 51 through 54, 56 through 59, 60, and 64 through 68 that form the fluid pressure actuator 40 based on control signals from the hybrid ECU 7 and signals from various sensors.

Sensors connected to the brake ECU 70 include a regulator pressure sensor 71, an accumulator pressure sensor 72, and a control pressure sensor 73. The regulator pressure sensor 71 detects the pressure (regulator pressure) of the brake oil inside the regulator channel 62 on the upstream side of the regulator pressure cut valve 65 and then provides a signal indicating a detected value to the brake ECU 70. On the downstream side of the pressure-increasing linear control valve 66, the accumulator pressure sensor 72 detects the pressure (accumulator pressure) of the brake oil within the accumulator channel 63 and then feeds a signal indicating a detected value to the brake ECU 70. The control pressure sensor 73 detects the pressure of the brake oil within the second channel 45b of the main channel 45 and then feeds a signal indicating a detected value to the brake ECU 70. The detected values of the respective pressure sensors 71 through 73 are periodically provided to the brake ECU 70 one after another and stored in a specified storage region (buffer) of the brake ECU 70 in increments of a predetermined amount.

When the communication valve 60 is open such that the first and second channels 45a and 45b of the main channel 45 communicate with each other, an output value of the control pressure sensor 73 indicates both the fluid pressure of the pressure-increasing linear control valve 66 on the low-pressure side and the fluid pressure of the pressure-reducing linear control valve 67 on the high-pressure side. Thus the output value can be used in controlling the pressure-increasing linear control valve 66 and the pressure-reducing linear control valve 67. When the pressure-increasing linear control valve 66 and the pressure-reducing linear control valve 67 are being closed while the communication valve 60 is in a de-energized state such that the first and second channels 45a and 45b of the main channel 45 are separated from each other, an output value of the control pressure sensor 73 indicates a master cylinder pressure. Furthermore, when the communication valve 60 is opened such that the first channel 45a and second channel 45*b* of the main channel 45 communicate with each other while the increased pressure holding valves 51 through 54 are opened with the pressure-reducing control valves 56 through 59 being closed, an output value of the control pressure sensor 73 indicates the brake pressure (wheel cylinder pressure) of the respective disc brake units 21FR through 21FL.

Further, a brake stroke sensor 25 described above is also connected to the brake ECU 70. The brake stroke sensor 25 detects an operation amount of the brake pedal 24 and then feeds a signal that indicates a detected value to the brake ECU 70. Detected values of the brake stroke sensor 25 are periodically provided to the brake ECU 70 one after another and stored in a specified storage region (buffer) of the brake ECU 70 in increments of a predetermined amount. In addition to the brake stroke sensor 25, a pedal depression sensor for detecting the operation state of the brake pedal 24 and a brake switch for detecting the depression of the brake pedal 24 may be connected to the brake ECU 70.

The brake control device configured as above is capable of performing regenerative-cooperative braking control. The fluid pressure brake unit 20 starts a braking operation upon receipt of a request for braking. The braking request occurs when a braking force needs to be applied to a vehicle, such as when the driver has operated the brake pedal 24. Upon receipt of the braking request, the brake ECU 70 computes a required braking force and then deducts a regenerative braking force from the required braking force to calculate a required fluid pressure braking force, which is a braking force to be generated by the fluid pressure brake unit 20. The regenerative braking force is supplied from the hybrid ECU to the brake control apparatus at this time. The brake ECU 70 calculates a target fluid pressure of each of the disc brake units 21FR through 21RL based on the required fluid pressure braking force thus calculated. Based on a feedback control rule, the brake ECU 70 determines the value of a control current to be supplied to the pressure-increasing linear control valve 66 and the pressure-reducing linear control valve 67 so that the wheel cylinder pressure becomes equal to the target fluid pressure.

As a result, in the fluid pressure brake unit 20, the brake fluid is supplied from the hydraulic power source 30 to the wheel cylinders of the respective disc brake units 21 via the pressure-increasing linear control valve 66 so that a braking force is applied on the wheels. The brake fluid is drained from each wheel cylinder via the pressure-reducing linear control valve 67 as necessary, thereby adjusting the braking force applied to the vehicle wheels. In the present embodiment, a wheel cylinder pressure control system comprises the hydraulic power source 30, the pressure-increasing linear control valve 66, the pressure-reducing linear control valve 67, etc. Braking force control using a so-called brake-by-wire method is performed by the wheel cylinder pressure control system. The wheel cylinder pressure control system is provided in parallel with a brake fluid supply route through which the brake fluid is supplied from the master cylinder unit 27 to the disc brake units 21.

The brake ECU 70 keeps the regulator pressure cut valve 65 to be in a closed state to ensure that no brake fluid is supplied from the regulator 33 to the wheel cylinders. Furthermore, the brake ECU 70 brings the master pressure cut valve 64 into a closed state and the simulator cut valve 68 into an open state. This is to ensure that the brake fluid fed from the master cylinder 32 is supplied not to the wheel cylinders of the disc brake units 21 but to the stroke simulator 69 as the brake pedal 24 is operated by a driver. During the regenerative-cooperative braking control, a differential pressure corresponding to the magnitude of the regenerative braking force works between the upstream and downstream of the regulator pressure cut valve 65 and the master pressure cut valve 64.

The above-stated battery of the hybrid vehicle has the property that the amount of input and output of the electrical energy drops dramatically when the temperature of the battery drops due to, e.g., a vehicle being left for a long time in winter time. As a result, until the temperature of the battery rises, there are less driving force assistance and amount of energy collection by the motor, and energy efficiency is thus lowered. Thus, it is desired to promptly raise the temperature of the battery.

According to the control of the present embodiment, whether or not the temperature of a battery is low is first determined and, when the temperature of the battery remains low for a long time, the temperature of the battery is promptly raised so that performance in regenerative energy collection is ensured.

Figure 3:
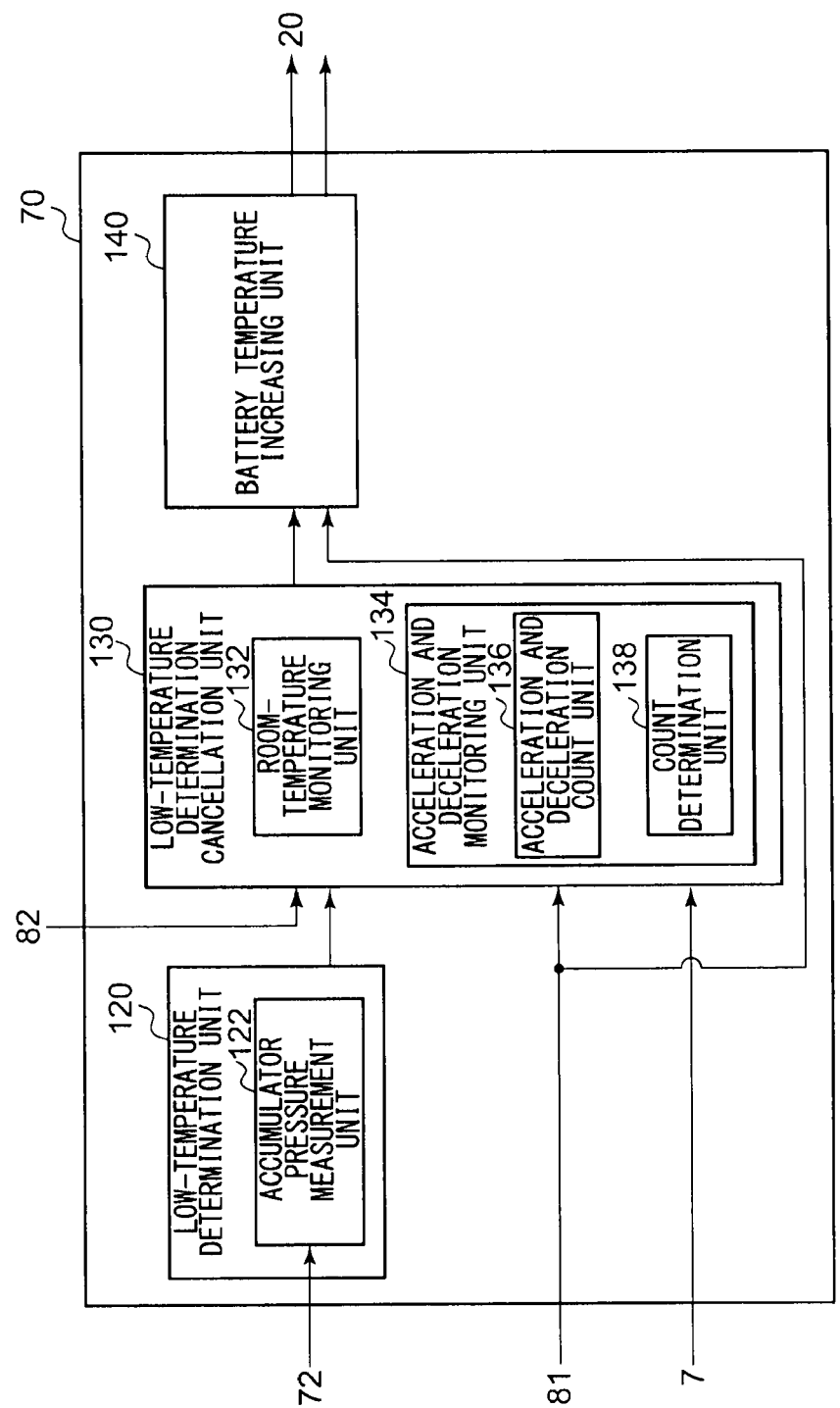
FIG. 3 is a functional block diagram illustrating the configuration of a portion of a brake ECU, which is responsible for temperature raising control when the temperature of a battery is low, according to the present embodiment.

FIG. 3 is a functional block diagram illustrating the configuration of a portion of the brake ECU 70 shown in FIG. 2, which is responsible for temperature raising control when the temperature of a battery is low, according to the present embodiment. The blocks shown in the block diagram are implemented in the hardware by any CPU or memory of a computer, other elements, or mechanical devices, and in software by a computer program or the like. FIG. 3 depicts functional blocks implemented by the cooperation of hardware and software. Thus, a person skilled in the art should appreciate that there are many ways of accomplishing these functional blocks in various forms in accordance with the components of hardware, software, or the combination of both.

The low-temperature determination unit 120 sets a low-temperature battery flag to be ON when the temperature of the battery 12 is below a predetermined temperature range. In the predetermined temperature range, battery performance can be realized that allows, for example, the collection of regenerative energy to be continued for a certain period of time at the time of regenerative braking. The predetermined temperature range is determined through experiments or based on the battery specification. The determination of whether the temperature of the battery 12 is low may be performed based on a detected value of a temperature sensor provided near the battery. In the present embodiment, the determination of whether the temperature is low is performed by an accumulator pressure measurement unit 122 based on a pressure change of the accumulator 35.

In general, a spool valve is employed for an accumulator. The spool valve is poor at holding pressure for a long time. Thus, if a vehicle is left unused for a long time, a phenomenon occurs where the accumulator pressure goes down close to 0 MPa (hereinafter, this phenomenon is referred to as "zero down"). When the zero down is being observed, it can be assumed that the vehicle has been left unused until the temperature of the battery and the temperature of the hydraulic power source 30 having an accumulator become almost the same. Using this, the accumulator pressure measurement unit 122 determines whether the temperature of the battery is low when the accumulator pressure is below a predetermined pressure P1, which is close to 0 MPa.

The accumulator pressure measurement unit 122 measures time t required from the start of pressure accumulation to the accumulator after the start-up of the vehicle until the accumulator pressure reaches a second predetermined pressure P2 (e.g., 19.88 MPa at which the motor 36*a* that drives the pump 36 becomes OFF) from P1. If this pressure accumulation time t is longer than predetermined time T1, the temperature of the battery is determined to be low. When the temperature of the accumulator is low just like the temperature of the battery, the pressure of nitrogen inside the accumulator is low, and the viscosity of the operating fluid is high. Thus, the pumping performance of the pump is reduced. Therefore, it takes longer for the accumulator pressure to reach the predetermined pressure P2 compared to when the temperature of the accumulator is in a normal temperature range (e.g., a predetermined temperature range in which the battery operates normally). This is applied to the above determination.

Whether or not the battery has desired performance may be determined regardless of the temperature thereof by employing an intelligent battery capable of managing the charge and discharge state of the battery itself, instead of providing the low-temperature determination unit 120.

A low-temperature determination cancellation unit 130 sets a low-temperature battery flag to be OFF when a predetermined condition is met. The low-temperature determination cancellation unit 130 includes a room-temperature monitoring unit 132 and an acceleration and deceleration monitoring unit 134.

The room-temperature monitoring unit 132 acquires a measurement value X (degrees Celsius) of a room-temperature sensor 82 that measures the temperature of the interior of a vehicle shown in FIG. 1. The low-temperature determination cancellation unit 130 sets a low-temperature battery flag to be OFF when a condition where the measurement value X is a predetermined temperature X1 or greater persists for at least a predetermined time T2. In general, a battery of a hybrid vehicle is installed under the backseat and is connected to the interior of the vehicle via a heat exhaustion channel. Therefore, it can be determined that the temperature of the battery rises as long as the temperature of the interior of the vehicle is maintained at a normal temperature for a long time. Therefore, the predetermined temperature X1 is set to be a normal temperature, e.g., 20 degrees Celsius. For the predetermined time T2, the amount of time estimated for the temperature of the battery to rise to the above predetermined temperature range when the temperature of the interior of the vehicle is X1 is experimentally obtained and set.

The acceleration and deceleration monitoring unit 134 sets a low-temperature battery flag to be OFF based on the number of acceleration and deceleration of the vehicle. The acceleration and deceleration monitoring unit 134 includes an acceleration and deceleration count unit 136 and a count determination unit 138. The acceleration and deceleration count unit 136 counts the number of times the vehicle experiences acceleration to a predetermined speed S1 (km/h) or greater and deceleration to a predetermined speed S2 (km/h) ore less (note that S2<S1).

The count determination unit 138 sets the low-temperature battery flag to be OFF when the number of counts counted by the acceleration and deceleration count unit 136 reaches a first threshold value N1. The following fact is applied to this setting. In other words, when the vehicle accelerates or decelerates, the battery 12 repeats releasing energy for driving the motor and collecting energy for regenerative braking. The predetermined speeds S1 and S2 and the threshold value N1 are preferably determined through experiments or simulations in consideration of both the amount of energy to be released and the amount of energy to be collected, which are required for the temperature of the battery to rise to the predetermined temperature range.

The count determination unit 138 may determine whether or not the regenerative brake unit is in operation based on information from the hybrid ECU 7. When the regenerative brake unit is not in operation, the count determination unit 138 may operate to set the low-temperature battery flag to be OFF when the number of counts counted by the acceleration and deceleration count unit 136 reaches a second threshold value N2 (note that N2<N1). This is because it can be considered as follows: when regenerative-cooperative control of a brake is being performed, the battery 12 operates to collect more energy compared to when regenerative-cooperative control is not being performed, and the temperature of the battery thus rises to the predetermined temperature range with less number of acceleration and deceleration events. Preferably, the threshold value N2 is also determined through experiments or simulations. The determination may be always carried out based on the first threshold value N1 without determining whether the regenerative-cooperative control is being performed.

A battery temperature increasing unit 140 generates a friction braking force by the fluid pressure brake unit 20 so as to increase the load on the motor when a condition where the low-temperature battery flag is ON persists for at least a predetermined time T3 since the startup of the vehicle or when the temperature is determined to be extremely low. This causes an electric discharge from the battery to the motor, raising the temperature of the battery.

Figure 4:
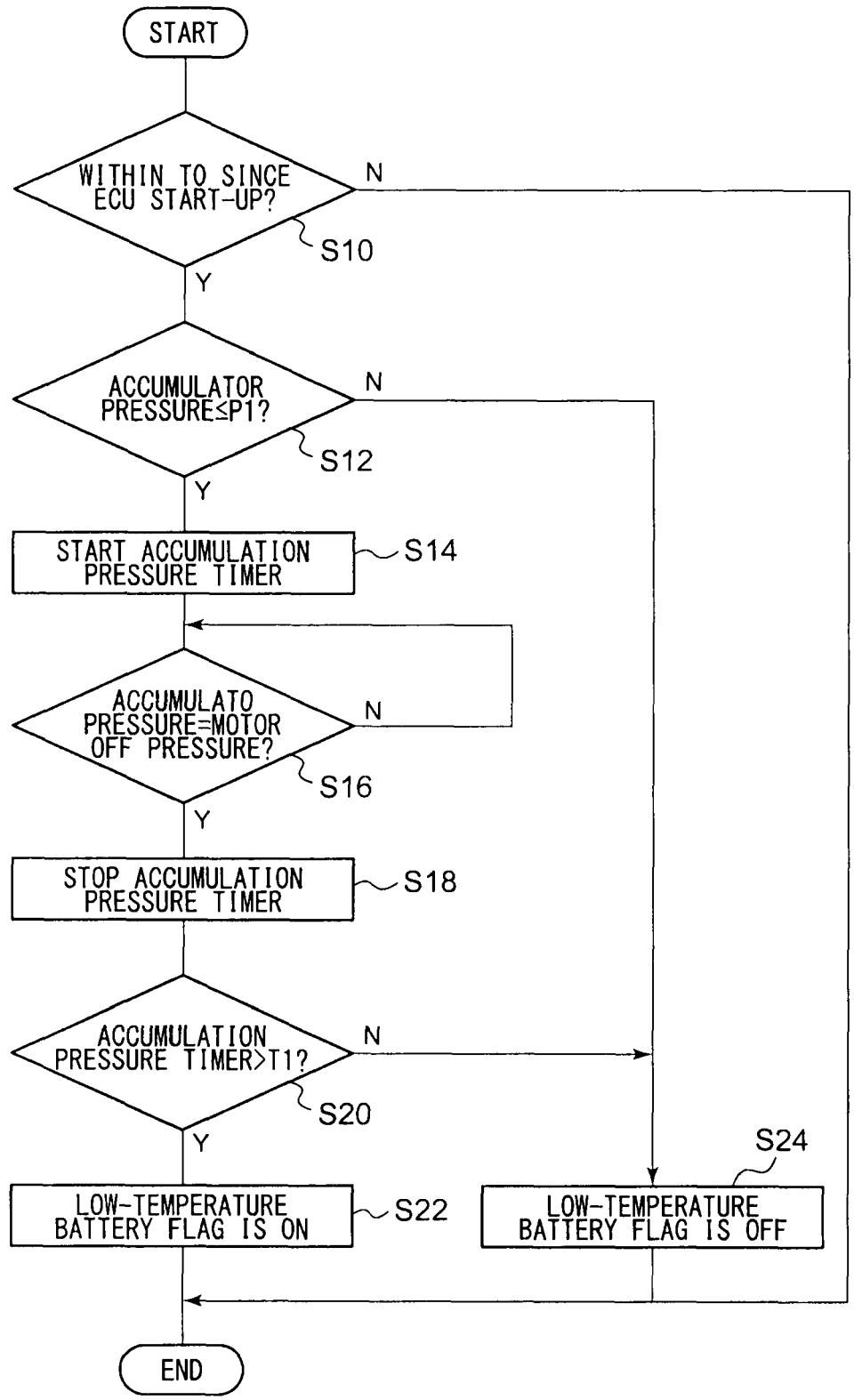
FIG. 4 is a flowchart of a process of determining whether the temperature of a battery is low by a low-temperature determination unit.

FIG. 4 is a flowchart of a process of determining whether the temperature of the battery is low by the low-temperature determination unit 120.

The accumulator pressure measurement unit 122 first determines whether or not it is within a predetermined time T0 since the start-up of the vehicle, e.g., the start-up of the brake ECU 70 (S10). When it is within T0 (Y in S10), the accumulator pressure measurement unit 122 determined whether or not the accumulator pressure is the predetermined pressure P1 or less, which is close to 0 MPa (S12). When the accumulator pressure is larger than P1 (N in S12), the low-temperature battery flag is set to be OFF since the determination of whether the temperature is low that is based on the accumulator pressure cannot be carried out (S24). When the accumulator pressure is P1 or less (Y in S12), a timer is started (S14). Time required until the accumulator pressure reaches a predetermined motor off pressure P2 is measured, and the timer is stopped (S18) when the accumulator pressure reaches P2 (Y in S16). The accumulator pressure measurement unit 122 determines whether or not the time t of the timer is longer than the predetermined time T1 (S20). When the time t is longer than T1 (Y in S20), the low-temperature battery flag is set to be ON in consideration that the pressure rising time of the accumulator is longer than normal (S22). When the time t is T1 or less (N in S20), the low-temperature battery flag is set to be OFF.

According to the process shown in FIG. 4, the determination of whether or not the temperature of the battery is low can be carried out based on the accumulator pressure even when a sensor for detecting the temperature of the battery is not provided. Also, since the process is to be completed only through communication within a brake ECU, it is not necessary to go through a CAN (Car Area Network). Thus, a ROM and RAM of the brake ECU can be eliminated.

Figure 5:
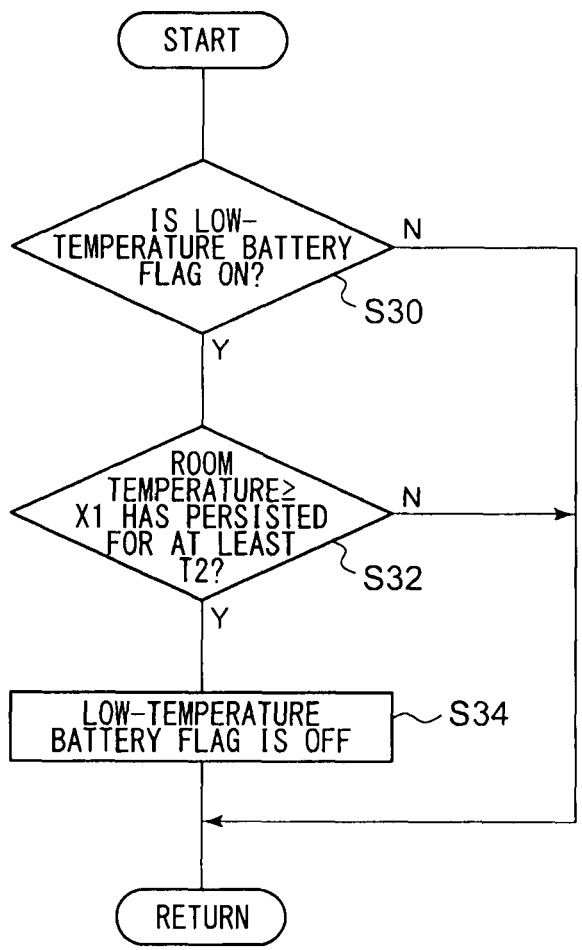
FIG. 5 is a flowchart of a process of canceling a low-temperature battery flag.

FIG. 5 illustrates a process of canceling a low-temperature battery flag. The process is repeatedly performed at a predetermined interval while the vehicle is moving.

The room-temperature monitoring unit 132 determines whether or not the low-temperature battery flag is ON (S30). When the flag is ON, the room-temperature monitoring unit 132 determines, based on a measurement value obtained by the room-temperature sensor 82, whether or not a condition where the temperature of the vehicle interior is X1 or greater has persisted for at least the predetermined time T2 (S32).

When the condition has persisted for the predetermined time T2 or longer (Y in S32), the low-temperature battery flag is set to be OFF on the assumption that the temperature of the battery has risen.

Since the installation places of the battery and the accumulator in the vehicle are apart from each other, accurate determination could not be carried out with use of the process of determining whether the temperature is low that is shown in FIG. 4. Thus, the temperature of the battery could not be actually low. Thus, when it is assumed based on the monitoring of the room temperature that the temperature of the battery has risen, according to the process shown in FIG. 5, the low-temperature battery flag can be set to be OFF.

Figure 6:
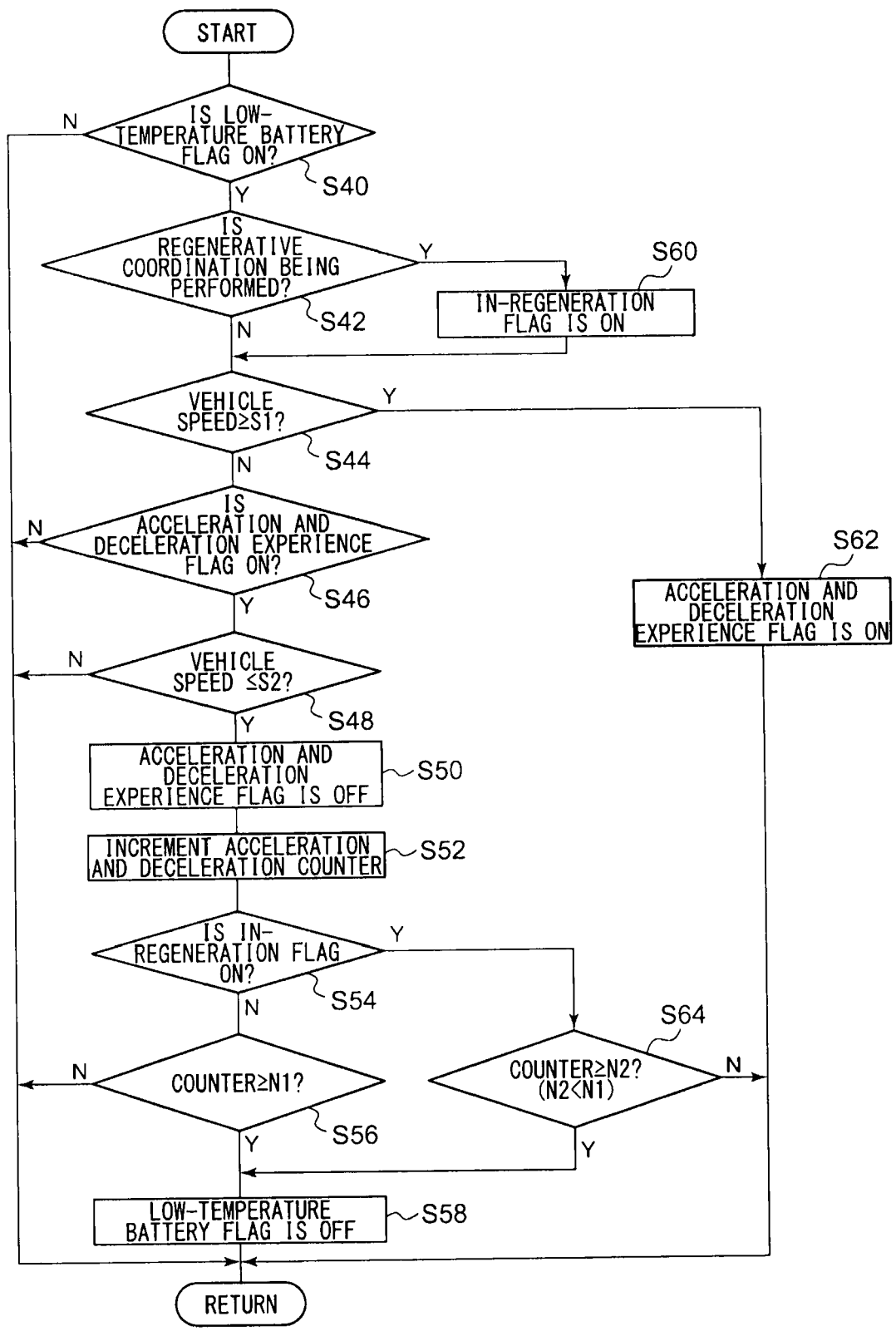
FIG. 6 is a flowchart of another process of canceling the low-temperature battery flag.

FIG. 6 is a flowchart of another process of canceling the low-temperature battery flag. The process is repeatedly performed at a predetermined interval while the vehicle is moving.

The acceleration and deceleration monitoring unit 134 determines whether or not the low-temperature battery flag is ON (S40). If the flag is ON (Y in S40), the acceleration and deceleration monitoring unit 134 determines based on information from the hybrid ECU whether the regenerative brake unit is in operation, in other words, whether or not regenerative coordination is being performed (S42). If the regenerative coordination is not being performed (N in S42), the step proceeds to S44. If the regenerative coordination is being performed (Y in S42), the acceleration and deceleration monitoring unit 134 sets an in-regeneration flag to be ON (S60).

Then, the acceleration and deceleration monitoring unit 134 determines based on a measurement value of a vehicle speed sensor 81 whether or not the vehicle speed is a predetermined speed S1 or greater (S44). If the vehicle speed is S1 or greater (Y in S44), the acceleration and deceleration monitoring unit 134 sets an acceleration and deceleration experience flag to be ON (S62). If the vehicle speed is below S1 (N in S44), the acceleration and deceleration monitoring unit 134 determines whether or not an acceleration and deceleration experience flag is being ON (S46). If the flag is ON (Y in S46), the acceleration and deceleration monitoring unit 134 further determines whether or not the vehicle speed is a predetermined speed S2 or below (S48). If the vehicle speed is S2 or below (Y in S48), the acceleration and deceleration monitoring unit 134 sets the acceleration and deceleration experience flag to be OFF (S50). The acceleration and deceleration experience flag has been switched from ON to OFF through the processes up to this point. In other words, it means that the vehicle has repeated acceleration of S1 or greater and deceleration of S2 or less once each. Therefore, the acceleration and deceleration monitoring unit 134 increments an acceleration and deceleration counter by one (S52).

The count determination unit 138 determines whether or not the in-regeneration flag is ON (S54). If the flag is OFF (N in S54), the count determination unit 138 determines whether or not the value of the acceleration and deceleration counter is the threshold value N1 or greater (S56). When the value of the counter is N1 or greater (Y in S56), the count determination unit 138 determines that the vehicle has experienced a sufficient number of acceleration and deceleration events for the temperature of the battery to rise to the predetermined temperature range (S58). If the flag is ON (Y in S54), the count determination unit 138 determines whether or not the value of the acceleration and deceleration counter is the threshold value N2 or greater (N2<N1) (S64). It can be considered that: when regenerative-cooperative control of a brake is being performed, the battery 12 operates to collect more energy compared to when regenerative-cooperative control is not being performed, and the temperature of the battery thus rises to the predetermined temperature range with less number of acceleration and deceleration events. Thus, if the value of the counter is N2 or greater (Y in S64), the low-temperature battery flag is set to be OFF (S58).

Figure 7:
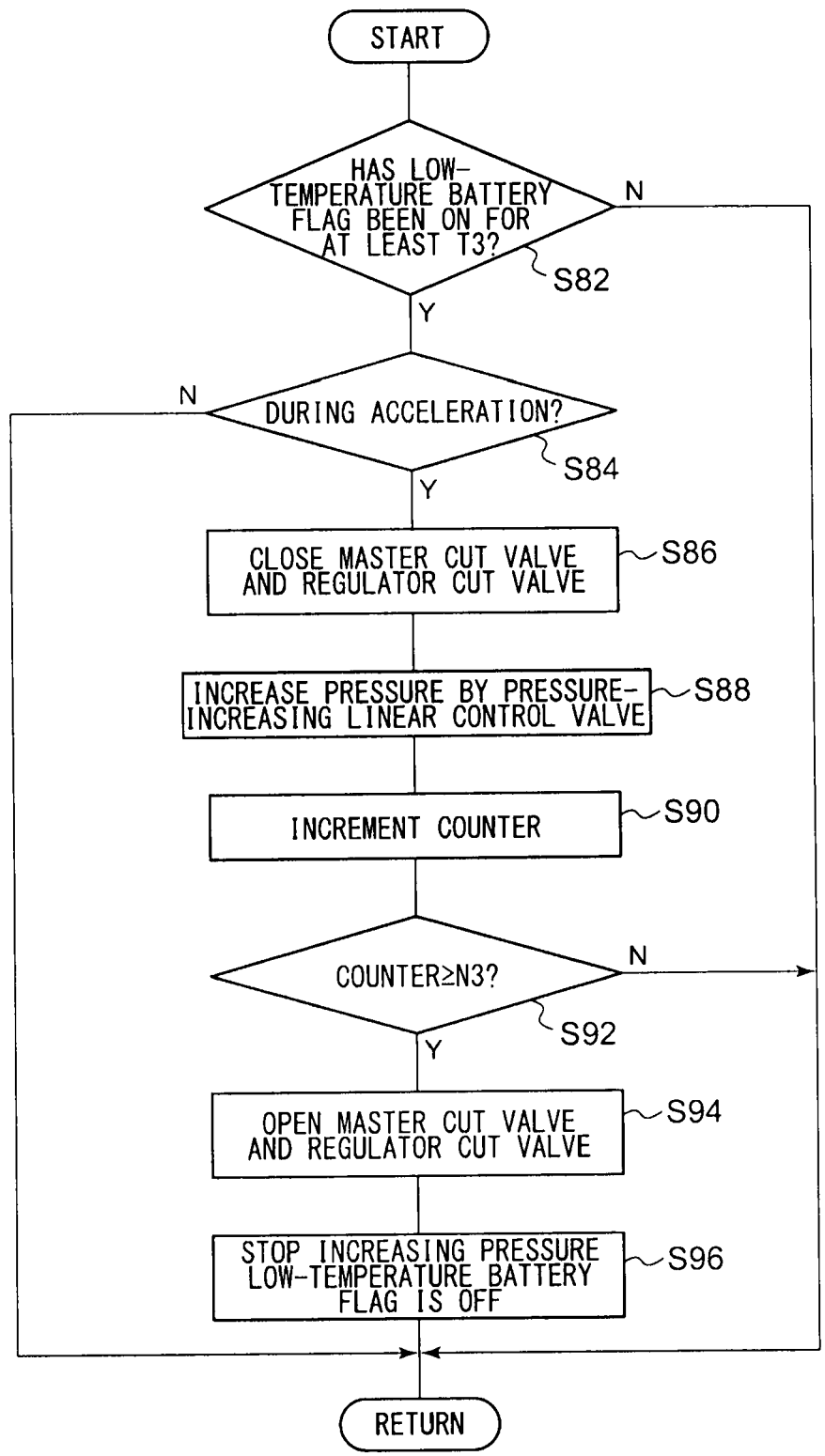
FIG. 7 is a flowchart of a process of raising the temperature of the battery.

FIG. 7 is a flowchart of a process of raising the temperature of the battery. The process is repeatedly performed at a predetermined interval while the vehicle is moving.

The battery temperature increasing unit 140 determines whether or not a condition where the low-temperature battery flag is ON has persisted for a predetermined time T3 or greater (S82). When the condition has persisted for T3 or greater (Y in S82), it is determined that the temperature of the battery has not risen to the predetermined temperature range depending on the acceleration or deceleration of the vehicle and the temperature of the interior of the vehicle, and the step proceeds to the following control for mandatorily raising the temperature of the battery. As another method, the step may proceed to the following control when the vehicle is in an environment where the temperature is extremely low.

The battery temperature increasing unit 140 determines whether or not the vehicle is accelerating based on a measurement value of the vehicle speed sensor 81 (S84). When the vehicle is not accelerating (N in S84), the following process is not performed. When the vehicle is accelerating (Y in S84), the battery temperature increasing unit 140 instructs the fluid pressure brake unit 20 to open the master pressure cut valve 64 and the regulator pressure cut valve 65 (S86). The battery temperature increasing unit 140 then increases the pressure of the wheel cylinders of the disc brake units by means of the pressure-increasing linear control valve 66 (S88). Although the vehicle is accelerating, this causes dragging of a brake pad, increasing the rotational load of the motor.

The battery temperature increasing unit 140 increments the counter (S90). The battery temperature increasing unit 140 then determines whether or not the value of the counter is the threshold value N3 or greater (S92). When the value of the counter is less than N3 (N in S92), this routine is ended. When the value of the counter is N3 or greater (Y in S92), the battery temperature increasing unit 140 determines that the amount of electric discharge from the battery has increased, raising the temperature of the battery, due to the increase in the load on the motor caused by the dragging and instructs the fluid pressure brake unit 20 to open the master pressure cut valve 64 and the regulator pressure cut valve 65 (S94) and to stop the pressure increase caused by the pressure-increasing linear control valve. The low-temperature battery flag is then set to be OFF (S96). With this, the performance of the battery in energy collection can be recovered, and the fuel efficiency can be improved. In addition, since the temperature of brake pads also rises, the brake feeling can be also improved.

In the process shown in FIG. 7, desired acceleration may not be obtained due to the generation of dragging during the acceleration of the vehicle. Thus, in performing the process shown in FIG. 7, an instruction may be given such that the driving force of the vehicle is slightly increased in anticipation of a decrease caused due to the dragging.

In FIG. 7, it is described that a friction braking force is generated by the fluid pressure brake unit 20 to apply load to the motor so as to raise the temperature of the battery. This control may be performed at all times. However, it is more effective to perform the control when the vehicle is being driven by the motor. The battery temperature increasing unit 140 may perform a step for determining whether the vehicle is being driven by the motor or by the engine before the step S82 in FIG. 7. When the vehicle is being driven by the motor only or by both the engine and the motor, processes in S82 and in the subsequent steps are performed. When the vehicle is being driven by the engine only, a regenerative braking force is generated by a regenerative brake unit, and, by providing the regenerative energy to the battery, the temperature of the battery is raised.

As described above, the load on the motor is increased by generating a friction braking force during the acceleration of the vehicle when the temperature of the battery is low, according to the present embodiment. As a result, electrical energy, which is larger than that of when there is no friction braking force, is released from the battery to the motor, and the temperature of the battery can thus be increased promptly.

Described above is an explanation of the present invention based on the several embodiments. These embodiments are intended to be illustrative only, and it will be obvious to those skilled in the art that various modifications such as an arbitrary combination of the embodiments and an arbitrary combination of constituting elements and processes are also within the scope of the present invention.

The present invention should not be limited to each of the aforementioned embodiments, and various modifications such as design modifications, can be made with respect to the above embodiments based on the knowledge of those skilled in the art. The structure illustrated in each drawing is intended to exemplify an example, and the structure can be appropriately modified to a structure having a similar function.

DESCRIPTION OF THE REFERENCE NUMERALS 2 engine
7 hybrid ECU
12 battery
20 fluid pressure brake unit
21 disc brake unit
35 accumulator
64 master pressure cut valve
65 regulator pressure cut valve
66 pressure-increasing linear control valve
72 accumulator pressure sensor
81 vehicle speed sensor
82 room-temperature sensor
100 vehicle
120 low-temperature determination unit
122 accumulator pressure measurement unit
130 low-temperature determination cancellation unit
132 room-temperature monitoring unit
134 acceleration and deceleration monitoring unit
136 acceleration and deceleration count unit
138 count determination unit
140 battery temperature increasing unit

The invention claimed is:

1. A brake control apparatus comprising:
an engine configured to drive a wheel;
a friction braking unit configured to generate a friction braking force by supplying an operating fluid to a wheel cylinder provided to each wheel of a vehicle so as to press a friction member against the wheel;
a regenerative braking unit configured to generate a regenerative braking force by electric power regeneration to a rotating electrical machine that drives the wheel;
a regenerative-cooperative control unit configured to control a distribution ratio of a braking force generated by the friction braking unit and the regenerative braking unit in accordance with a braking request from a driver;
a battery configured to collect electric power from the rotating electrical machine;
a low-temperature determination unit configured to determine that the temperature of the battery is low when the temperature of the battery is below a predetermined temperature range; and
a battery temperature increasing unit configured to generate, when the temperature of the battery is determined to be low by the low-temperature determination unit, a braking force to the vehicle by at least either the friction braking unit or the regenerative braking unit during acceleration of the vehicle by the rotating electrical machine or the engine so as to increase a load on the rotating electrical machine, wherein
the friction braking unit includes an accumulator for increasing the pressure of the operating fluid supplied to the wheel cylinder by pump drive and an accumulator pressure measurement unit for measuring the pressure of the accumulator, and
the low-temperature determination unit determines that the temperature of the battery is low when time required for increasing the pressure of the accumulator to a predetermined pressure by the pump is longer than pressure rising time required when the temperature of the accumulator is in the predetermined temperature range.

2. The brake control apparatus according to claim 1, further comprising:
a low-temperature determination cancellation unit configured to cancel the determination that the temperature of the battery is low determined by low-temperature determination unit, wherein
the low-temperature determination unit includes:
an acceleration and deceleration count unit configured to count the number of times the vehicle experiences acceleration and deceleration; and
a count determination unit configured to cancel the determination that the temperature of the battery is low when the number of counts reaches a first threshold value during non-operation of the regenerative brake unit and to cancel the determination that the temperature of the battery is low when the number of counts reaches a second threshold value, which is smaller than the first threshold value, during operation of the regenerative brake unit.

3. The brake control apparatus according to claim 1, further comprising:
a low-temperature determination cancellation unit configured to cancel the determination that the temperature of the battery is low determined by low-temperature determination unit, wherein
the low-temperature determination unit includes:
a temperature measurement unit configured to measure the temperature of the interior of the vehicle; and
a room-temperature monitoring unit configured to cancel the determination that the temperature of the battery is low, when a condition where the temperature of the interior of the vehicle is a predetermined temperature or greater has persisted for at least a predetermined time period that is estimated for the temperature of the battery to rise to the predetermined temperature range.

* * * * *